US012350848B2

(12) United States Patent
Haifeng

(10) Patent No.: US 12,350,848 B2
(45) Date of Patent: Jul. 8, 2025

(54) FOLDING KNIFE WITH PUSH BUTTON LEVER LOCK

(71) Applicant: She Haifeng, Yangjian (CN)

(72) Inventor: She Haifeng, Yangjian (CN)

( * ) Notice: Subject to any disclaimer, the term of this patent is extended or adjusted under 35 U.S.C. 154(b) by 52 days.

(21) Appl. No.: 18/472,916

(22) Filed: Sep. 22, 2023

(65) Prior Publication Data

US 2024/0149476 A1 May 9, 2024

(51) Int. Cl.
*B26B 1/04* (2006.01)

(52) U.S. Cl.
CPC .................................... *B26B 1/046* (2013.01)

(58) Field of Classification Search
CPC .. B26B 1/046; B26B 1/10; B26B 1/08; B26B 1/042; B26B 1/00; B26B 1/02; B26B 1/04; A45F 5/02
USPC ......... 30/153, 155, 156, 157, 158, 159, 160, 30/161
See application file for complete search history.

(56) References Cited

U.S. PATENT DOCUMENTS

| | | | | |
|---|---|---|---|---|
| 6,732,436 | B2 * | 5/2004 | Moizis | B26B 1/046 30/155 |
| 8,099,870 | B1 * | 1/2012 | Ralph | B26B 1/046 30/162 |
| 9,737,997 | B1 * | 8/2017 | Marfione | B26B 1/04 |
| 11,602,864 | B1 | 3/2023 | Perkins | |
| 11,633,867 | B1 | 4/2023 | Crawford et al. | |
| 11,639,006 | B1 | 5/2023 | Chumchal | |
| 2006/0200995 | A1 * | 9/2006 | Anderson | B26B 1/048 30/155 |
| 2007/0169354 | A1 * | 7/2007 | Ralph | B26B 1/048 30/160 |
| 2012/0304470 | A1 * | 12/2012 | Freeman | B26B 1/046 30/159 |
| 2013/0047439 | A1 * | 2/2013 | Hawk | B26B 1/04 30/160 |
| 2013/0125403 | A1 * | 5/2013 | Westerfield | B26B 1/046 30/161 |
| 2015/0352730 | A1 * | 12/2015 | Duey | B26B 1/048 30/159 |
| 2022/0410414 | A1 | 12/2022 | Dong | |
| 2024/0093724 | A1 * | 3/2024 | Beitzel | F16C 19/06 |

* cited by examiner

*Primary Examiner* — Ghassem Alie
(74) *Attorney, Agent, or Firm* — Heidi Eisenhut; LOZA & LOZA, LLP

(57) ABSTRACT

A folding knife with a push-down button lever lock structure includes a blade, and the front and rear sides of the blade are installed with a front handle and a back handle through an installation mechanism. At the position between the front handle and the back handle close to a right side through a screw and a spring locking piece is connected and fixed with a bottom bone, and a left side of a spring locking is coupled with an unlocking piece. The front side of the spring locking piece corresponding to the side is equipped with a limit nail, and the spring locking piece is close to the front of the handle. A suction bead is installed on a top near the front of the handle, and at an end of a bottom bone.

19 Claims, 2 Drawing Sheets

FOLDING KNIFE WITH PUSH BUTTON LEVER LOCK

CLAIM OF PRIORITY

This application claims priority of Chinese application CN202222928355.XU, filed Nov. 3, 2022, now Chinese patent no. CN 218699014U, issued on Mar. 24, 2023, the entire contents of which are incorporated by reference.

TECHNICAL FIELD

Embodiments are generally related to a folding knife with a push-down button lever lock structure.

BACKGROUND

Pocket knives provide a convenient tool for cutting that may be easily carried by a user. A folding knife is a particular style of pocket knife that has a blade pivotally connected to a handle. The handle generally includes a pair of handle elements that sandwich the blade between them, and the blade pivots with respect to the handle elements to transition between retracted and deployed positions. When retracted, a cutting edge of the blade resides between the scales, and the handle elements protect the cutting edge from inadvertent contact that might damage the cutting edge or cause personal injury. When deployed, the blade extends from the handle elements to expose the cutting edge for use.

A manually operated pocket knife design generally requires two hands to deploy and retract the blade. A single action pocket knife design typically includes a spring that assists the user to deploy the blade using a single hand, whereas a double action pocket knife design generally includes a spring that assists the user to both deploy and retract the blade using a single hand. Each design balances the convenience and speed of operation with increased risk associated with inadvertent operation.

In the conventional art, traditional folding knives lack the locking function of the blade when the blade is opened. During the process, the blade is easy to touch and close by mistake, and it is easy to cause the fingers of the personnel to be scratched by the closed blade. This has a large safety impact making the knife very inconvenient to use, i.e., the folding knife being dropped and accidentally touched when the blade is closed. An impact on the knife results in a risk of accidentally opening the blade, which is easy to damage, and the knife may accidentally injure people.

There is accordingly a need for safer folding knife technologies.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide folding knife with a push button lever lock structure, including a blade 1; a front handle 3; a back handle 4, front and rear sides of the blade 1 being mounted with the front handle 3 and the back handle 4 through an installation mechanism 2; the installation mechanism 2 comprising, along a central axis, a central shaft 201, a bearing 202, a gasket 203, a button 204 and a first screw 205; the central shaft 201 bring inserted into the front handle, the blade 1 and the back handle; bearings 202 and gaskets 203 installed in sequence on the central shaft 201 in a direction of the front handle 3 and the back handle 4; a button 204 arranged on a front side of the central shaft 201 at a front side of the front handle 3; a rear side of the central shaft 201 is located on an inner side of the back handle 4, and the outer side of the back handle is threaded with a first screw 205; a positioning shaft 5 inserted into the blade 1 located close to an upper side and a corresponding positive side of the positioning shaft 5; waist-shaped grooves 6 provided on inner walls of the front handle 3 and the back handle 4; a second screw 7 is installed on a rear inner wall near an upper left corner of the front handle 3 and the back handle 4; a third screw 8 located at a right side between the front handle 3 and the back handle 4, the third screw 8 fixing a spring locking piece 9 and a bottom bone 10; an unlocking piece 11 installed on a buckle on a left side of a spring locking piece 9, a rear side of the unlocking piece 11 being attached to a front side of a rotation position of the spring locking piece 9, and a front side of the unlocking piece 11; a front side of the spring locking piece 9 being equipped with a limit nail 12; a suction bead 13 installed on a top near a left side, and a right end of the bottom bone 10; and a fourth screw 14 connected and fixed with the front handle 3 and the back handle 4.

In an embodiment, the front handle 3, the blade 1 and the back handle 4 are penetrated by the central shaft 201 and through-holes 15 for installation. The push button lever lock structure has a cover 16 is installed on the outer side of the front handle 3 corresponding to the button 204. The push button lever lock structure at a position corresponding to the suction bead 13 on the spring locking piece 9 is provided with a round hole 17 configured for installation. The push button lever lock structure at the base bone 10 is fixed at the positions corresponding to the third screw 8 and the fourth screw 14. The push button lever lock structure at the right side of the blade 1 is provided with a first bayonet (21), and a lower surface of the blade 1 is provided with a second bayonet 22. The suction bead can be a glass bead, and the spring locking piece may be elastic.

In an embodiment, a pressure cylinder 18 is embedded in the bottom bone 10, and the pressure cylinder 18 facilitates the connection mechanism between the third screw 8 and the fourth screw 14, so that the front handle 3 and the back handle 4 are firmly and stably installed between the spring locking piece 9 and the bottom bone 10. When the knife is closed, the spring locking piece 9 pushes the suction glass bead 13 to buckle or engage, and the suction glass bead 13 is installed at the second bayonet 22 on the blade 1 to lock the blade 1. When the button is pressed, the installation mechanism 2 pushes the unlocking piece 11 backward, and the unlocking piece 11 drives the suction glass bead 13 on the spring locking piece 9 to move backward, so that the suction bead 13 is misaligned with the second bayonet 22.

It is, therefore, one aspect of the disclosed embodiments to provide a method of unlocking a folding knife with a push button lever lock structure, including pressing the button 204; and rotating the blade 1 so that the elastic spring locking piece 9 is reset left and right by elastic force, and the first bayonet 21 of the blade 1 is aligned with the elastic spring locking piece 9, wherein the left side of the locking piece 9 is pressed tightly to prevent the blade 1 from being folded, and at the same time, the blade 1 rotates to open or close at a fixed position.

It is, therefore, one aspect of the disclosed embodiments to provide folding knife with a push button lever lock structure, including a blade 1; a front handle 3; a back handle 4; an installation mechanism 2 proximal and inserted through the front handle 3, the blade 1 and the back handle 4, the installation mechanism 2 comprising, along a central axis, a central shaft 201, a bearing 202, a gasket 203, a button 204 and a first screw 205; the bearings 202 and gaskets 203 installed in sequence on the central shaft 201 in a direction of the front handle 3 and the back handle 4; a button 204 arranged on a front side of the central shaft 201 at an outer side of the front handle 3; a rear side of the central shaft 201 being located on an inner side of the back handle 4, and the outer side of the back handle is threaded with a first screw 205; a positioning shaft 5 inserted into an opening in a distal end of the blade 1; waist-shaped grooves 6 provided on inner walls of the front handle 3 and the back handle 4; a second screw 7 is installed on a rear inner wall near an upper left corner of the front handle 3 and the back handle 4; a third screw 8 located at a right side between the front handle 3 and the back handle 4, the third screw 8 fixing a spring locking piece 9 and a bottom bone 10 embedded with a pressure cylinder 18; an unlocking piece 11 installed on a buckle on a left side of a spring locking piece 9, a t-shaped rear end of the unlocking piece 11 being attached to a front side of a rotation position of the spring locking piece 9, and a front end of the unlocking piece 11 being forked; a front side of the spring locking piece 9 being equipped with a limit nail 12; a glass suction bead 13 installed on a top near a left side, and a right end of the bottom bone 10; and a fourth screw 14 connected and fixed with the front handle 3 and the back handle 4.

In an embodiment, the front handle 3, the blade 1 and the back handle 4 are penetrated by the central shaft 201 and through-holes 15 for installation. The push button lever lock structure has a cover 16 is installed on the outer side of the front handle 3 corresponding to the button 204. The push button lever lock structure at a position corresponding to the suction bead 13 on the spring locking piece 9 is provided with a round hole 17 configured for installation. The push button lever lock structure at the base bone 10 is fixed at positions corresponding to the third screw 8 and the fourth screw 14.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
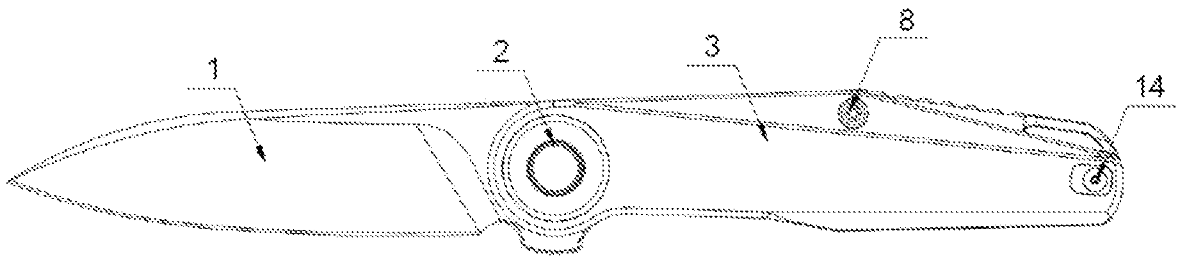
FIG. 1 is a side view of the folding knife according to an embodiment of the disclosure.

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing"

(and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The disclosure provides a folding knife with a push-down button lever lock structure to solve the problems of the background technology.

In order to achieve the above purpose, the disclosure provides the following technical solutions utilizing a push-down button lever. A folding knife with a lock structure includes a blade, the front and rear sides of the blade are equipped with a front handles through a mounting mechanism and a back reverse handle, An installation mechanism includes a central shaft, a bearing, a gasket, a button and a first screw. The central shaft is inserted into the front handle, the blade and the back handle sequentially from front to back, and the blade has bearings and spacers installed on a central shaft in the direction of the front handle and the back handle in sequence, and the front of the central shaft. The front outer of the front handle is provided with a button, and the rear side of the central shaft is located at the outer side of the reverse handle.

A threaded hole is installed with a first screw, and the blade is provided with a positioning shaft near the upper side. There are waist-shaped grooves on the inner wall of the front handle and the back handle. A second screw is installed near the upper left corner, and the position between the front handle and the back handle is close to the right side. A third screw is used to connect and fix a spring lock and a bottom bone, and the left side of the spring lock is buckled and installed. There is an unlocking piece, and the rear side of the unlocking piece fits with the front side of the rotation position of the spring locking piece and the unlocking piece. The front side of the spring locking, corresponding to the front side, is equipped with a limit nail, and the spring locking is close to the left side. Suction glass bead(s) are installed in the device, and the right end of the bottom bone is connected with the front handle and the back hand through the fourth screw. The handle connection is fixed.

The front handle, the blade and the back handle are all equipped with holes for the installation of the central shaft. A cover is installed on the front side of the front handle corresponding to the button. There is a place on the spring locking piece corresponding to the suction glass bead for the installation of the suction glass bead. The corresponding positions of the third screw and the fourth screw are fixedly embedded on the base bone pressure cylinder.

Further, the outer side of the front handle corresponding to the fourth screw is equipped with a trim piece. A back clip is installed on the outer side of the reverse handle corresponding to the fourth screw. The rear of the blade is provided with a first bayonet, and the lower surface of the blade is provided with a second bayonet at a position corresponding to the suction glass bead.

Compared with the conventional art, the disclosure provides a push-button lever lock structure folding knife, which has the following beneficial effects:

The push-button lever lock structure folding knife, through the installation mechanism, the front handle, connects with the handle on the opposite side, blade is opposed to the spring locking, and the unlocking piece is driven by the installation mechanism to move.

The misalignment of the spring lock and the blade can quickly lock the blade or quickly unlock the blade, making the knife easier and more flexible to open and close the blade, which greatly improves the convenience of the knife.

The disclosure will now be discussed in greater detail with reference the FIGS. 1 to 3.

Figure 2:
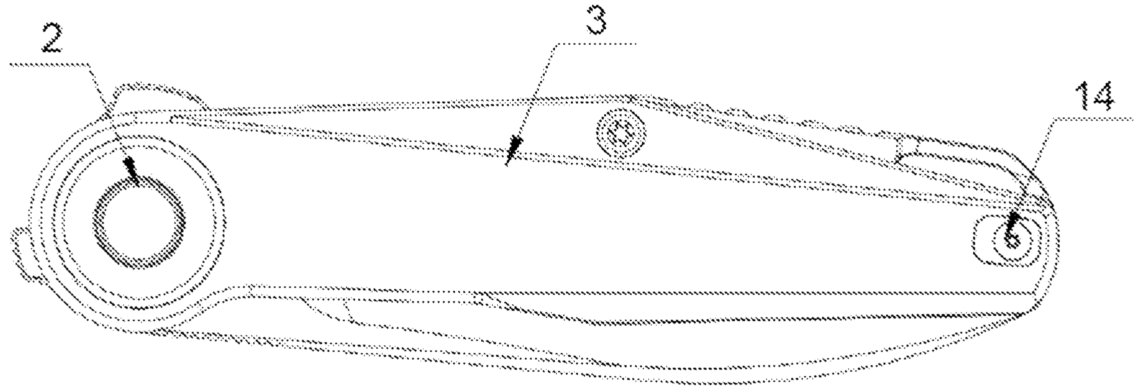
FIG. 2 is a schematic view of the closed folding knife according to an embodiment of the disclosure.

The side view of the open folding knife in FIG. 1 shows a blade 1, mounting mechanism 2, front handle 3, a third screw 8 and a fourth screw 14. The closed folding knife shown in FIG. 2 shows the mounting mechanism 2, the front handle 3 and the fourth screw 14. The mounting mechanism is located centered about 10 to 12% of the length of the handle from the front or proximal end of the handles. For Example, when the handles have a length of 100 mm, the center of the mounting mechanism would be located about 10 to 12 mm from the front end of the handles.

Figure 3:
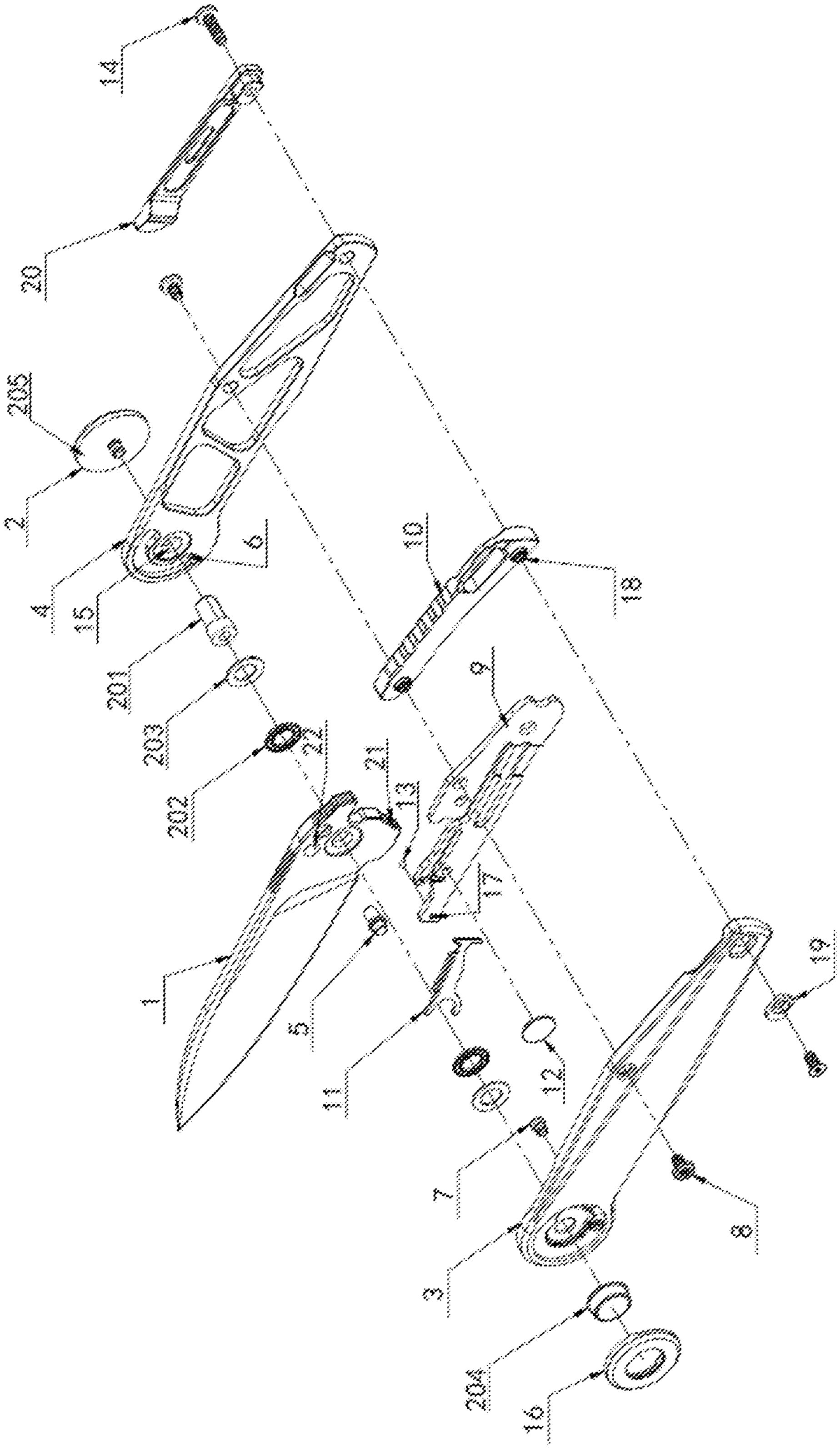
FIG. 3 is an exploded view of the folding knife according to an embodiment of the disclosure.

The exploded view in FIG. 3 shows details of the mounting mechanism 3. The mounting or installation mechanism 3 includes a cylindrical central shaft 201 having tip with a wider diameter than its body, a bearing 202 and a washer or gasket 203 between the central shaft 201 and the bearing 202. A button 204 is located in a recess in the front handle 3 and is secured by a cover 16. A first screw 205 is located opposite to the button on the outer side of the back handle 4. Positioning shaft 5 is fitted into a central cavity located at the rear of the blade 1. In the mounting or installation mechanism 2 a first screw 205 and the central shaft 201 are inserted into the front handle 3 and the back handle 4 in sequence from the front to back in the back handle 4 along a central axis. The blade 1 rotates on the central shaft 201 in the direction of the front handle 3 and the reverse handle 4.

The bearing 202 and the washer 203 are installed, and a complementary bearing and washer are installed on the opposite side of the blade 1. The front side of the central shaft 201 is located at the outer side of the front handle 3. The button and the rear side of the central shaft 201 are located on the back or inner side of the handle 4, and the first screw 205 is installed at the rear side or outer side of the handle 4.

The blade 1 is provided with a positioning shaft 5 close to the upper side, and the corresponding side of the positioning shaft 5 is in juxtaposition with the nail 205. Both the inner wall of the front handle 3 and the inner wall of the back handle 4 are provided with a waist-shaped groove 6. The inner wall of the front handle 3 and the inner wall of the back handle 4 are provided with polyhedral shaped recesses. A second screw 7 is installed near the upper left corner of the front handle 3, and the space between the front handle 3 and the back handle 4 is close to the right side.

The position of the blade is connected and fixed with the spring locking piece 9 and the bottom bone 10 through the third screw 8 and the left side of the spring locking piece 9. The side buckle of the spring locking piece 9 is equipped with an unlocking piece 11 having a forked front side and a T-shaped rear side, and the rear side of the unlocking piece 11 is in contact with the front side of the rotation position of the spring locking piece 9.

The front side of the spring locking piece 9, corresponding to the front side of the unlocking piece, 11 is installed with a limit nail 12. A suction glass bead 13 is installed near the left side position or front of the spring locking piece 9, and the right end (rear end) of the bottom bone 10 are all connected and fixed with the front handle 3 and the back handle 4 through the fourth screw 14.

The front handle 3, the blade 1 and the back handle 4 are provided with a central shaft 201 installed in the through holes 15.

In an embodiment, the through hole 15 facilitates the central shaft 201 to connect the front handle 3, the blade 1 and the back handle 4. The handles 3, 4 are movably connected together.

A cover 16 is installed on the outer side of the front handle 3 corresponding to the button 204. In this embodiment, the cover 16 covers all or part of the button 204 to make the appearance more aesthetic.

The position corresponding to the suction glass bead 13 is set on the elastic spring locking piece 9 with at least one round hole 17 for mounting. In this embodiment, round hole 17 is convenient for installing the suction glass bead 13 so that the suction glass bead is stably installed.

The positions corresponding to the third screw 8 and the fourth screw 14 are fixed on the base bone 10, and a pressure cylinder 18 is embedded therein. In this embodiment, the pressure cylinder 18 facilitates the connection mechanism between the third screw 8 and the fourth screw 14, so that the front handle 3 and the back handle 4 are firmly and stably installed between the spring locking 9 and the bottom bone 10.

The outside of the front handle 3, corresponding to the fourth screw 14, is equipped with a trim 19. A back clip 20 is installed on the rear side of the reverse handle 4, corresponding to the fourth screw 14. In this embodiment the trim 19 is a decorative sheet decorating the fourth screw on the front side of the front handle 3. The back clip 20 increases the tool holding function, which can hold the tool in the pocket and place it stably The right or distal end of the blade 1 is provided with a first bayonet opening 21 and a second bayonet opening 22, opening on the lower surface of the blade 1, corresponding to the suction glass bead 13. The first bayonet 21 makes the blade 1 and the locking piece close, and the blade 1 is not easy to close. The suction glass bead 13 buckles with the second bayonet 22, so that the blade 1 is not easy to open.

When in use, when the blade 1 is in the closed state, the spring locking piece 9 pushes the suction glass bead 13 to buckle, and It is installed at the second bayonet 22 on the blade 1 to lock the blade 1 to prevent the blade 1 from being opened at will.

Pressing the button 204 in the installation mechanism 2 pushes the unlocking piece 11 backward, and the unlocking piece 11 drives the suction glass bead 13 on the spring locking piece 9 to move backward, so that the suction bead 13 is misaligned with the second bayonet 22.

To unlock the blade 1, rotate the blade 1 to move the blade 1 so that the front handle 3 and the back handle 4 rotate in the middle to open, and after opening, the elastic spring locking piece 9 is reset left and right by the elastic force, and the first bayonet 21 of the blade 1 is aligned with the elastic spring locking piece 9. The left side of the locking piece 9 is pressed tightly to prevent the blade 1 from being folded, and at the same time, the blade 1 rotates to open or close at a fixed position. The positioning shaft 5 moves along the inner wall of the waist groove 6, so that the blade 1 can rotate stably, and the blade 1 can be quickly locked or unlocked, making it easier and more flexible to open the blade 1 and retract the blade 1 when using the knife The disclosure greatly improves the convenience and safety of the tool, so that the integrity of the tool can be achieved.

To sum up, the push button lever lock structure folding knife, through the installation mechanism 2 and the unlocking piece 11 cooperates with the spring locking piece 9 to quickly lock the blade 1 or quickly unlock the blade 1, so that when using the knife, it is easier and more flexible to open the blade 1 and retract the blade 1, which greatly improves the convenience of the knife. The practicality of use and safety makes the integrity of the tool achieve better results.

There is a range of materials that can form the knife of the disclosure. The blade can be formed from carbon steel, tool steel or stainless steel. The steel may contain chromium (Cr). Chromium is a powerful alloying element in steel. It strongly increases the hardenability of steel, and markedly improves the corrosion resistance of alloys in oxidizing media. Its presence in some steels could cause excessive hardness and cracking in and adjacent to welds. Stainless steels may contain in excess of 12% chromium. Cr is not a strong hardenability agent as compared to some other elements such as manganese (Mn) or molybdenum (Mo). Cr has also a strong tendency to form hard and stable carbides. This property gives Cr steels the ability to resist softening during tempering and makes the tempered Cr steels hard and wear resistant. However, it also means that for a given hardness level, Cr steels need higher tempering temperatures, or longer tempering times, than the plain C steels. This effect increases with increasing Cr content of the steel. Tool steels, and alloy steels containing significant quantities of carbide forming elements such as Cr, need higher austenitizing temperatures in order to dissolve the carbides completely. As in the case of stainless steels, Cr has a tendency to promote grain growth. Hence careful control of austenitizing temperatures is important in Cr containing alloy and tool steels. Presence of vanadium (V) in some of the Cr steels counteracts this phenomenon. The blade can also be made from titanium.

The suction glass bead 13 can be made from borosilicate glass, which can be annealed for greater strength. The glass bead can be formed from other materials such as steel or plastic.

The handle can be made from wood, bone, leather, steel, titanium, aluminum, Micarta (Thin layers of linen or paper are soaked in resin), carbon fiber, reinforced nylon, etc.

The elements of the folding knife set forth in the drawing figures of the disclosure are summarized in Table 1.

TABLE 1

Elements of the Folding Knife of the Disclosure.

| No. | Description |
|---|---|
| 1 | Blade |
| 2 | Mounting mechanism |
| 3 | Front handle |
| 4 | Back Handle |
| 5 | Positioning shaft |
| 6 | Waist-shaped groove |
| 7 | Second screw |
| 8 | Third screw |
| 9 | Spring locking piece |
| 10 | Bottom bone |
| 11 | Unlocking piece |
| 12 | Limit nail |
| 13 | Suction bead |
| 14 | Fourth screw |
| 15 | Through hole |

TABLE 1-continued

| Elements of the Folding Knife of the Disclosure. | |
|---|---|
| No. | Description |
| 16 | Cover |
| 17 | Round hole |
| 18 | Pressure cylinder |
| 19 | Trim |
| 20 | Back clip |
| 21 | First bayonet |
| 22 | Second bayonet |
| 201 | Central shaft |
| 202 | Bearing |
| 203 | Washer |
| 204 | Button |
| 205 | First screw |

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

What is claimed is:

1. A folding knife, comprising:

a blade (1);

a front handle (3);

a back handle (4), front and rear sides of the blade (1) being mounted to the front handle (3) and the back handle (4) with an installation mechanism (2);

the installation mechanism (2) comprising, along a central axis, a central shaft (201), a button (204) and a first screw (205);

the central shaft (201) being inserted into the front handle (3), the blade (1) and the back handle (4);

a first bearing (202) and a first gasket (203) installed in sequence on the central shaft (201) in a direction of the front handle (3), a second bearing (202) and a second gasket (204) installed in sequence in a direction of the back handle (4);

the button (204) being arranged on a front side of the central shaft (201) at a front side of the front handle (3);

a rear side of the central shaft (201) located on an inner side of the back handle (4), and an outer side of the back handle is threaded configured for a first screw (205), a positioning shaft (5) having a positive side inserted into an upper side of the blade (1);

a first waist-shaped groove (6) provided on an inner wall of the front handle (3), and a second waist-shaped groove provided on an inner wall of the back handle (4);

a second screw (7) installed on a rear inner wall near an upper left corner of the front handle (3) and the back handle (4);

a third screw (8) located between the front handle (3) and the back handle (4), the third screw (8) fixing a spring locking piece (9) and a bottom bone (10);

an unlocking piece (11) installed on a buckle on a left side of the spring locking piece (9), a rear side of the unlocking piece (11) being attached to a side of a rotation position of the spring locking piece (9), and the unlocking piece (11);

a front side of the spring locking piece (9) being equipped with a limit nail (12);

a locking bead (13) installed on an end of the bottom bone (10); and a fourth screw (14) connecting the front handle (3) and the back handle (4).

2. The folding knife according to claim 1, wherein the front handle (3), the blade (1) and the back handle (4) penetrate the central shaft (201) via through-holes (15) for installation.

3. The folding knife according to claim 1, wherein a cover (16) is installed on an outer side of the front handle (3) corresponding to the button (204).

4. The folding knife according to claim 1, wherein at a position corresponding to the locking bead (13) on the spring locking piece (9), is provided a round hole (17) configured for installing the spring locking piece (9).

5. The folding knife according to claim 1, wherein the bottom bone (1) is fixed at positions by the third screw (8) and the fourth screw (14).

6. The folding knife according to claim 1, wherein a pressing cylinder (18) is embedded in the bottom bone (10).

7. The folding knife according to claim 1, wherein a trim (19) is at the outer side of the front handle (3) corresponding to the fourth screw (14).

8. The folding knife according to claim 1, wherein a back clip (20) is installed on the outer side of the back handle (4) on an opposite side corresponding to the fourth screw (14).

9. The folding knife according to claim 1, wherein the knife at a right side of the blade (1) is provided with a first bayonet (21), and a lower surface of the blade (1) is provided with a second bayonet (22).

10. The folding knife according to claim 1, wherein the locking bead is a glass bead.

11. The folding knife according to claim 1, wherein a pressure cylinder (18) is embedded in the bottom bone (10), and the pressure cylinder (18) facilitates a connection mechanism between the third screw (8) and the fourth screw (14), so that the front handle (3) and the back handle (4) are installed between the spring locking piece (9) and the bottom bone (10).

12. The folding knife according to claim 1, wherein when the knife is in a closed position, the spring locking piece (9) pushes the locking bead (13) to buckle, and the locking bead (13) is positioned at a second bayonet (22) on the blade (1) to lock the blade (1).

13. The folding knife according to claim 1, wherein when the button is pressed, the installation mechanism (2) pushes the unlocking piece (11) backward, and the unlocking piece (11) drives the locking bead (13) on the spring locking piece (9) to move backward, so that the locking bead (13) is misaligned with a second bayonet (22).

14. A method of unlocking the folding knife of claim 1, comprising:

pressing the button; and rotating the blade so that the spring locking piece (9) is reset left and right by elastic force, and a first bayonet (21) of the blade (1) is aligned with the spring locking piece (9), wherein the left side of the spring locking piece (9) is pressed tightly to prevent the blade (1) from being folded, and at the same time, the blade (1) rotates to open or close at a fixed position.

15. The method of unlocking the folding knife according to claim 14, wherein the positioning shaft (5) moves along the inner wall of the waist-shaped groove (6)), so that the blade (1) can rotate stably, and the blade (1) can be locked or unlocked.

16. A folding knife, comprising:

a blade (1);

a front handle (3);

a back handle (4);

an installation mechanism (2) proximal to the front handle (3), the installation mechanism (2) being inserted through the front handle (3), the blade (1) and the back handle (4), the installation mechanism (2) comprising, along a central axis, a central shaft (201), a button (204) and a first screw (205);

a first bearing (202) and a first gasket (203) installed in sequence on the central shaft (201) in a direction of the front handle (3), a second bearing (202) and a second gasket (204) installed in sequence in a direction of the back handle (4);

the button (204) being arranged on a front side of the central shaft (201) at an outer side of the front handle (3);

a rear side of the central shaft (201) being located on an inner side of the back handle (4), and the outer side of the back handle is threaded configured for a first screw (205);

a positioning shaft (5) inserted into an opening in a distal end of the blade (1);

a first waist-shaped groove (6) provided on an inner wall of the back handle (4), and a second waist-shaped groove provided on an inner wall of the front handle (3);

a second screw (7) is installed on the rear inner walls near upper left corners of the front handle (3) and the back handle (4);

a third screw (8) located between the front handle (3) and the back handle (4), the third screw (8) fixing a spring locking piece (9) embedded in a bottom bone (10);

an unlocking piece (11) installed on a buckle on a left side of the spring locking piece (9), a t-shaped rear end of the unlocking piece (11) being attached to a side of a rotation position of the spring locking piece (9), and a front end of the unlocking piece (11) being forked;

a front side of the spring locking piece (9) being equipped with a limit nail (12);

a glass locking bead (13) installed on a top near the left side of the spring locking piece (9), and a right end of the bottom bone (10); and a fourth screw (14) connecting the front handle (3) and the back handle (4).

17. The folding knife according to claim 16, wherein the front handle (3), the blade (1) and the back handle (4) penetrate the central shaft (201) via through-holes (15), and wherein a cover (16) is installed on the outer side of the front handle (3) corresponding to the button (204).

18. The folding knife according to claim 16, wherein at a position corresponding to the locking bead (13) on the spring locking piece (9), a round hole (17) configured for installation is provided.

19. The folding knife according to claim 16, wherein the base bone (10) is fixed at positions by the third screw (8) and the fourth screw (14).

* * * * *